Nov. 8, 1932.  W. K. MITCHELL  1,886,415
TEAPOT
Filed Jan. 17, 1931
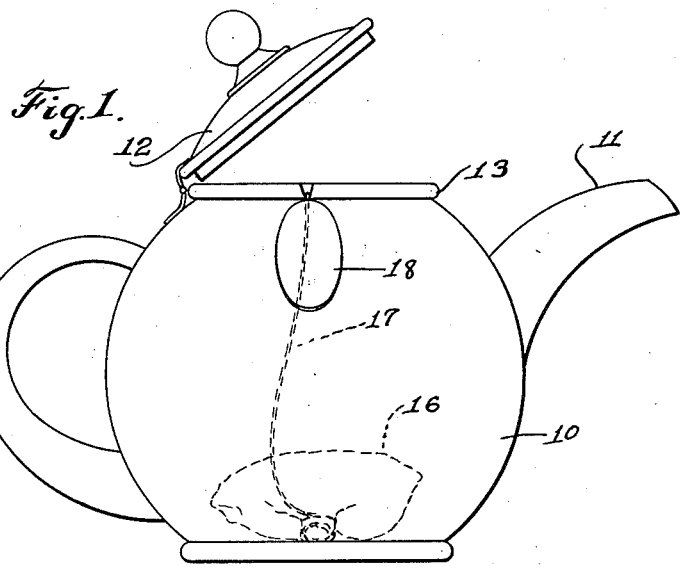
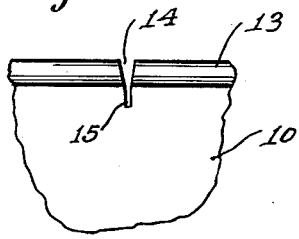
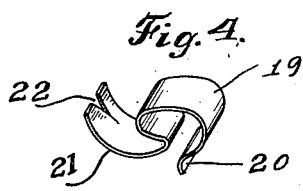
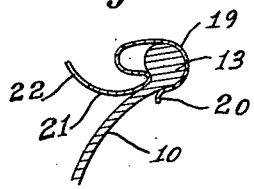
INVENTOR
William K. Mitchell
BY Edward S. Higgins
ATTORNEY Patented Nov. 8, 1932

1,886,415

UNITED STATES PATENT OFFICE

WILLIAM K. MITCHELL, OF YONKERS, NEW YORK

TEAPOT

Application filed January 17, 1931. Serial No. 509,358.

This invention relates to tea pots. The use of tea balls or cartridges for making tea is becoming universal. The use of the ordinarily constructed tea pot for making tea with these balls presents many difficulties among which are the necessity of holding the string of the ball over or near the opening of the pot into which the boiling water is poured often resulting in the burning of the hand and/or the falling of the string with the colored tag into the water. These drawbacks of the ordinary tea pots are overcome in my present invention by providing a tea pot with means carried by the rim of the pot for effectively and securely holding the string with its tag, preventing it from falling into the pot. With my improved device, the tea ball, after the tea has brewed sufficiently, may be raised to the top of the pot above the water and held there, thus preventing the tea from becoming steeped and at the same time hiding the unsightly tea ball from view when the cover is on the pot.

An important object of my invention is to provide such a tea pot that is simple in construction and economical to manufacture.

Other advantages of my improved tea pot will be in part pointed out and in part obvious from the description thereof to follow taken in connection with the accompanying drawing, in which—

Figure 1 is a side view of my improved tea pot with a tea ball mounted therein.

Figure 2 is an enlarged fragmentary view of a detail.

Figure 3 is a modified form of my invention.

Figure 4 is a perspective view of the form shown in Figure 3.

Referring to Figures 1 and 2 my improved tea pot comprises the usual bulbous shaped body portion 10, with spout 11 and hinged lid 12. The body may be made of metal, or any other suitable material and may of course be shaped as desired. The lid may be detachably mounted instead of hinged.

A bead 13 forms the rim of the upper opening and cooperates with the lid 12 in holding it on. This rim may have a straight upper edge instead of being rounded.

Cut through the periphery of and into the rim 13 at any point but preferably on the side of the body is a slight recess 14 which may be slightly V-shaped and which communicates with a straight narrow slot 15 formed in the body 10, for a purpose which will be presently explained.

In using my improved pot, the tea ball 16 is placed inside with the bag portion resting on the bottom. The string 17 is then inserted through the V-shaped recess 14 and slot 15, the shape of the recess facilitating its insertion. When in this position the string is held between the walls of the slot 15 and is guided by said walls in any further movement and any inward movement of said string will cause the tag 18 on the string to engage the outer surface of the body and stop any further movement of the string or tag, thus preventing the tag and string from falling into the pot.

In the form shown in Figures 3 and 4, the device comprises a flat spring member consisting of a curved body portion 19 terminating in a curved end 20 on one side and a similar curved end 21 on the opposite side, the end 21 being curved outwardly and upwardly to a point substantially to the top of the body portion. This curved portion 21 is slitted as at 22 which slit may be narrow and straight or substantially V-shaped. This device because of the inherent springiness of the material of which it is composed may be sprung over the rim of almost any pot no matter what the shape of said rim may be. It is readily mounted and removed from the rim. The upper curved top portion is adapted to rest snugly against the rim of the pot and when thus positioned will not interfere with the closing of the lid.

In using the device the string of the tea ball is run over the top of the body portion and through the slit 22, the walls of which will guide its further movement and the tag will engage its walls preventing any further movement as will be understood. When the tea is sufficiently brewed, the ball may be pulled out of the water to the top of the pot adjacent the rim and if the string is inserted in this slit the walls thereof will hold the ball in this position out of the water and out of sight when the lid is closed.

While I have illustrated several forms of my invention, it will be understood that changes might be made therein in details and I desire to be limited only by the state of the prior art and the appended claim.

I claim:

A teapot for use with a tea-bag having the usual string and tag on the free end of the string, comprising a body container with an open top and a rim defining the opening and for supporting the lid of the teapot, means on said rim for holding the string and tag of the tea-bag from falling into the body container when the lid is removed and during the pouring of the hot water into the container upon the tea-bag, said means comprising a slot in the rim of such depth and width as to receive and hold the string of a tea-bag freely insertable and removable through the slot, said tag engaging the rim to hold the string and tag from passing entirely through the slot when the tea-bag is in the body container.

WILLIAM K. MITCHELL.